United States Patent [19]
Smith

[11] Patent Number: 4,798,492
[45] Date of Patent: Jan. 17, 1989

[54] SHAFT COUPLING AND METHOD FOR USING SAME

[76] Inventor: Thomas R. Smith, 710 W. 11th St., South, Newton, Iowa 50208

[21] Appl. No.: 129,245

[22] Filed: Dec. 7, 1987

[51] Int. Cl.$^4$ ............................................. F16D 1/00
[52] U.S. Cl. ................................. 403/223; 285/229; 403/220
[58] Field of Search ............... 464/177, 170; 285/229, 285/255, 40; 403/223, 220

[56] References Cited

U.S. PATENT DOCUMENTS

| | | | |
|---|---|---|---|
| 579,334 | 3/1897 | Williams | 464/170 |
| 773,047 | 10/1904 | Bayles | 285/229 X |
| 809,903 | 1/1906 | Bowers | 285/229 |
| 3,328,976 | 7/1967 | Shoemacker et al. | 464/177 |
| 4,175,405 | 11/1979 | Smith et al. | 464/170 X |
| 4,488,738 | 12/1984 | Valdes | 285/40 |

*Primary Examiner*—James T. McCall
*Attorney, Agent, or Firm*—Zarley, McKee, Thomte, Voorhees & Sease

[57] ABSTRACT

The coupling of the present invention is used for joining two shafts together. The coupling comprises a first hub and a second hub which are joined together by a central web located therebetween. Both the first and second hubs include an inner bore extending therethrough and an outer tapered surface. The bores of the first and second hubs are sized to receive the two shafts which are to be connected. A pair of nuts, each having a threaded tapered bore extending therethrough are threaded over the outer tapered surfaces of the two hubs until the nuts exert an inner radial force on the hubs, thereby causing the hubs to frictionally grip and hold the shafts against movement relative to the coupling body. The coupling body may be longitudinally divided into two separate halves which embrace the opposite sides of the shafts and which are held together by the nuts which surround the tapered hub portions thereof.

16 Claims, 3 Drawing Sheets

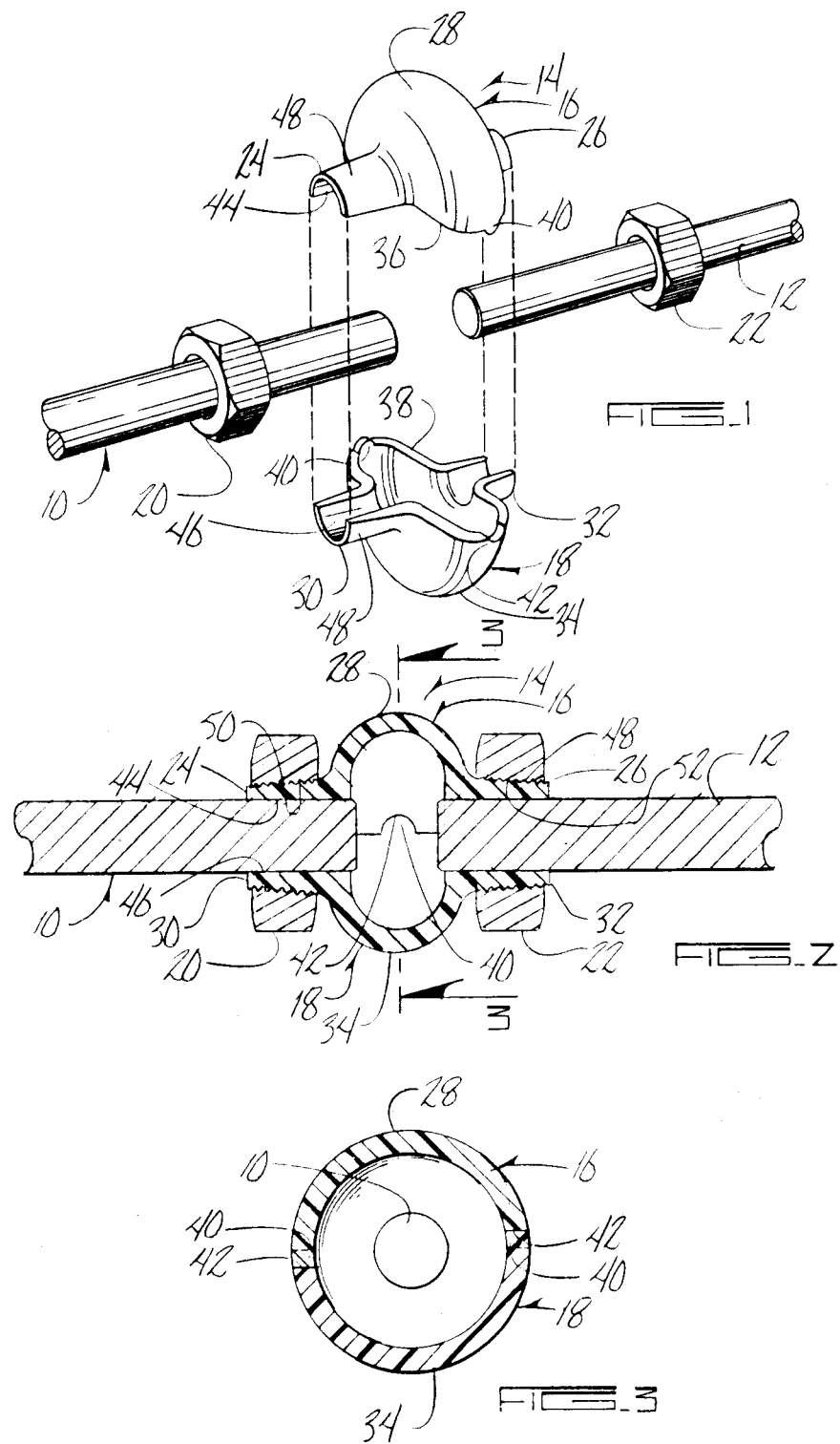

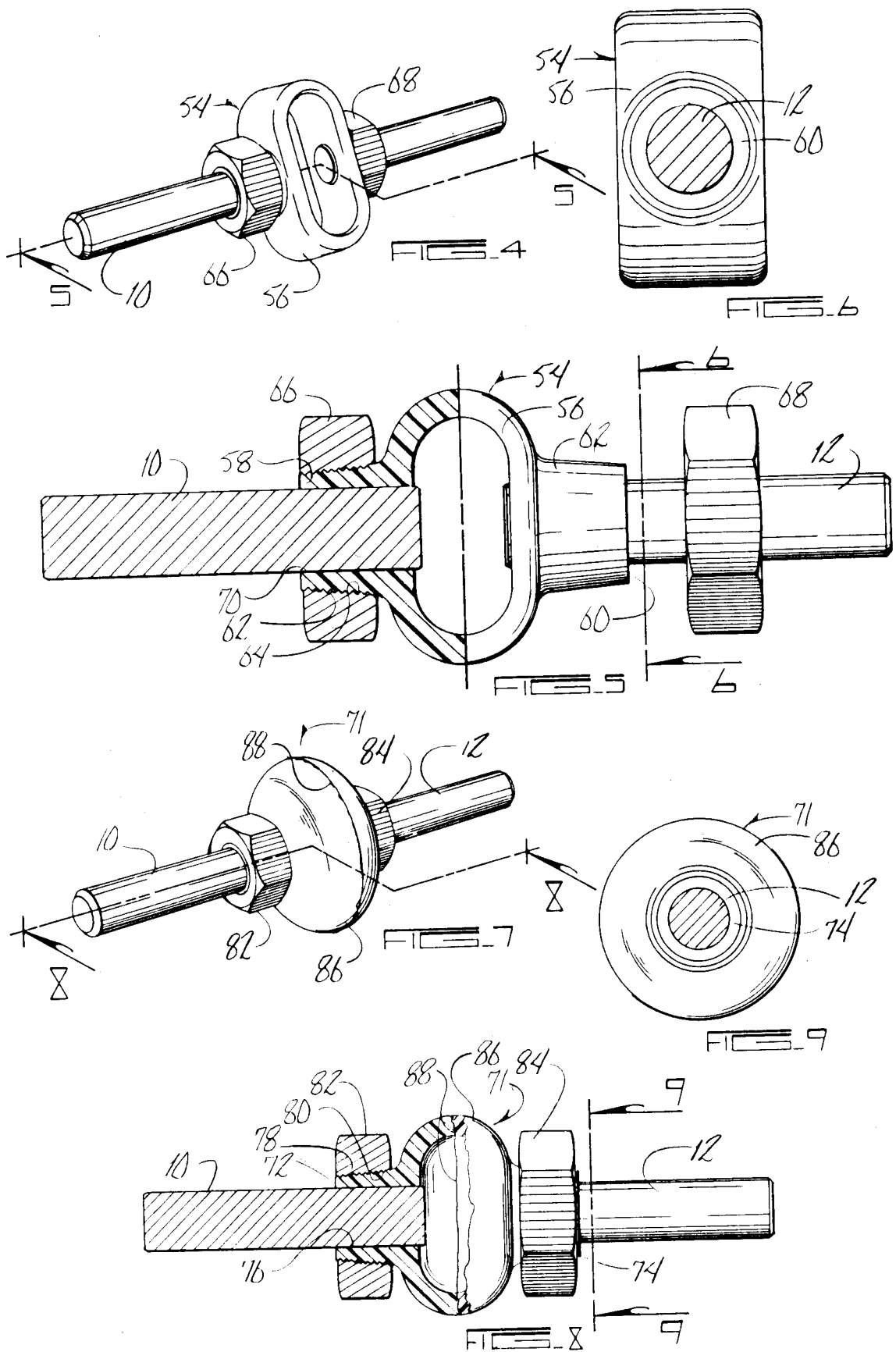

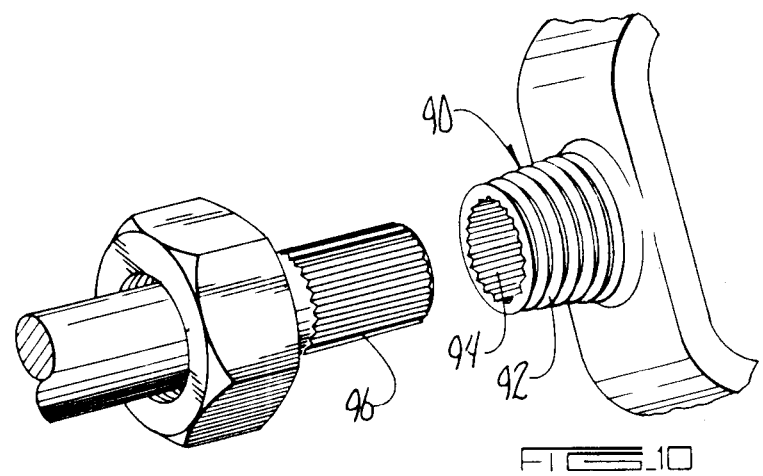
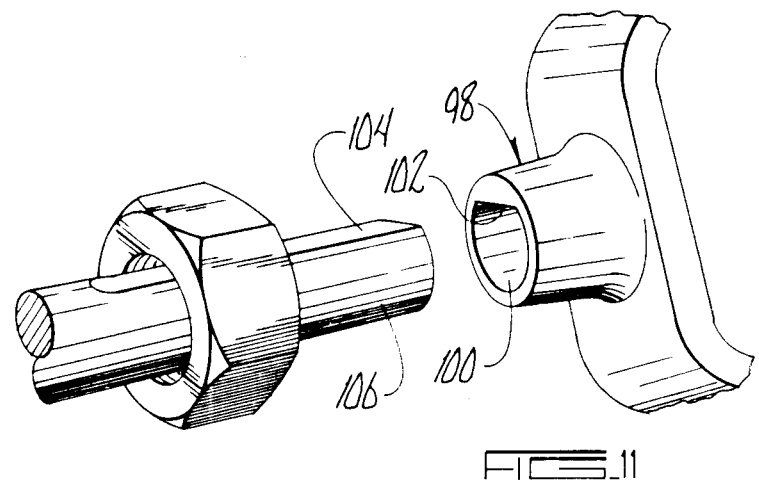

SHAFT COUPLING AND METHOD FOR USING SAME

BACKGROUND OF THE INVENTION

This invention relates to drive couplings for joining two shafts together, and more particularly to a flexible coupling.

Flexible couplings for accommodating impact, vibration, and misalignment between driving and driven members have previously been shown in the prior art. Previous devices, however, have been somewhat complicated assemblies of several components, have been expensive because of the several components and assembly labor, and have been limited in degree of loading or misalignment that could be accommodated. Furthermore, difficulty has been encountered in providing a simple and easy manner in which to attach the couplings of the shafts.

Therefore, a primary object of the present invention is the provision of an improved coupling and method for using same.

A further object of the present invention is the provision of a coupling which can be quickly and tightly attached to both a drive shaft and a driven shaft.

A further object of the present invention is the provision of an improved coupling which is separated into two parts which can be fitted around both the drive shaft and the driven shaft and which may be held in place by two nuts having tapered threaded bores extending therethrough.

A further object of the present invention is the provision of a device which is economical to manufacture, durable in use and efficient in operation.

SUMMARY OF THE INVENTION

The present invention relates to a coupling for fastening a driving shaft to a driven shaft. The coupling has tapered end hubs which are preferably made of an elastomer. The hubs have bores extending inwardly from their opposite ends for receiving the drive shaft and the driven shaft. Collars or nuts with internal tapered threads are adapted to engage and conform with the tapered end hubs to compress the elastomer end hubs into frictional driving engagement with the driving shaft and the driven shaft. The tapered end hubs may be threaded to match the internal threads of the nuts or they may be smooth, relying on the internal threads of the nuts to compress and form threads into the surface of the tapered end hubs as the nuts are tightened. The nuts may be provided with hexagon flats or other means for receiving a wrench or tightening tool.

The preferred embodiment of the present invention utilizes two substantially identical coupling halves which are held together in driving engagement with the drive shaft and the driven shaft by means of the two retaining collars or nuts with tapered threads on their inside diameters. These two nuts conform to and engage with the round tapered coupling end hubs which are formed by placing the two coupling halves together over the drive and driven shafts. When the nuts are tightened onto the conforming tapered surfaces of the end hubs, the inside surfaces of the end hubs are compressed into frictional engagement with the drive shaft and the driven shaft. Flats, splines, keys or other connecting means may be provided between the end hubs and the drive shaft or driven shaft, or friction alone obtained by tightening the nuts on the end hubs may be used for connecting the coupling to the shafts.

Another modification of the present invention comprises a main coupling body constructed entirely of a single elastomeric thermoplastic wherein the coupling is formed of two substantially identical halves joined on a plane at the coupling midpoint, the plane extending at right angles to the axis of rotation. The two halves are joined on the plane at right angles to the axis of rotation at the coupling midpoint. The two mating surfaces at this midpoint are heated to reach the softening or melting point of the plastic, and are then forced together to form the complete coupling.

Another modification of the present invention comprises molding the coupling as a unitary member having the two end hubs and having a central portion which is formed into an O-shaped web. The hubs have the tapered ends as with the above described modifications so as to receive the nuts for tightening the hubs inwardly against the shafts.

BRIEF DESCRIPTION OF THE DRAWINGS

FIG. 1 is an exploded perspective view of the present invention.

FIG. 2 is a front elevational view of the device with the tightening nuts in place.

FIG. 3 is a sectional view taken along line 3—3 of FIG. 2.

FIG. 4 is a perspective view of a modified form of the present invention.

FIG. 5 is a sectional view taken along line 5—5 of FIG. 4.

FIG. 6 is a sectional view taken along line 6—6 of FIG. 5.

FIG. 7 is a perspective view of a modified form of the present invention.

FIG. 8 is a sectional view taken along line 8—8 of FIG. 7.

FIG. 9 is a sectional view taken along line 9—9 of FIG. 8.

FIG. 10 is a perspective view showing a further modified form of the present invention.

FIG. 11 is a perspective view showing a further modified form of the present invention.

DETAILED DESCRIPTION OF THE PREFERRED EMBODIMENT

Referring to FIG. 1, the numeral 10 generally designates a drive shaft which is adapted to be connected to a driven shaft 12 by a coupling designated generally by the numeral 14. Coupling 14 comprises an upper coupling body 16 and a lower coupling body 18, and two tightening nuts 20, 22. Upper coupling body 16 is comprised of a pair of opposite end hub portions 24, 26 and a web portion 28 which interconnects the two hub portions 24, 26. Lower coupling body 18 is of substantially similar construction and includes a pair of end hub portions 30, 32 interconnected by a central web portion 34. Upper coupling body 28 is provided with a downwardly presented margin or edge 36 and lower coupling body 18 is provided with a complementary upwardly presented margin or edge 38. Downwardly presented edge 36 includes an aligning nipple 40 which is adapted to be received within an aligning receptacle 42 of the upwardly presented edge 38 of lower coupling body 18. Similarly, lower coupling body 18 is provided with an aligning nipple 40 which is adapted to be received in a receptacle 42 in the downwardly presented edge 36 of coupling body 16.

End hub portions 24, 26 include a partial cylindrical bore 44 extending therethrough, and end hub portions 30, 32 are similarly provided with a partial cylindrical bore 46. Partial cylindrical bores 44 are adapted to join with partial cylindrical bores 46 so as to embrace and conform to the outer cylindrical surfaces of shafts 10, 12 as shown in FIG. 2. As also can be seen in FIG. 2, each end hub portion 24, 26, 30, 32 includes an outer tapered cylindrical surface 48 which commences at an inner diameter at its end and which progresses radially outwardly towards the central web portions 28, 34.

Nuts 20, 22 each include tapered threaded bores 50, 52 respectively, which are threaded and which conform to the outer tapered surfaces 48 of end hub portions 24, 26, 30, 32.

Upper coupling body 16 and lower coupling body 18 are preferably made of an elastomeric material. A preferred material is manufactured by DuPont Company, Wilmington, Del., under the product designation Hytrel G-4774. The nuts 20, 22 are preferably constructed of a harder material so that the threads on the internal bores of the nuts 20, 22 will cause deformation of the outer tapered surfaces 48 of the end hubs so as to create threads on the outer tapered surfaces 48. As can be seen in FIG. 1, the tapered surfaces 48 are initially smooth. It is also possible to construct hub portions 24, 26, 30, 32 so that the outer tapered surfaces 48 are initially provided with threads adapted to threadably receive the threads on the interior of nuts 20, 22.

The coupling 14 is used in the following manner. The two shafts 10, 12 are placed in proximity to one another with their opposite ends spaced apart as shown in FIG. 1. Upper coupling body 16 and lower coupling body 18 are then fitted together with the partial bores 44, 46 embracing and conforming to the outer cylindrical surfaces of shafts 10, 12 as shown in FIG. 2. Nuts 20, 22 are then fitted over the hub portions 24, 26, 30, 32 and are threaded toward the central web portions 28, 34. Because of the conforming tapered configurations of the outer surfaces 48 on the hubs and the tapered configuration of the internal threaded bores 50, 52 of nuts 20, 22, the continued threading of the nuts 20, 22 causes the hub portions 24, 26, 30, 32 to be compressed radially inwardly toward shafts 10, 12. This causes the hubs to tightly grip the shafts 10, 12 and hold them against rotation or axial movement with respect to the coupling 14. The tapered surfaces 48 are constructed so that nuts 20, 22 do not thread tightly up against the web portions 28, 34, but instead are spaced axially a short distance away from web portions 28, 34. This insures that the nuts will create tight securement of the hubs to the shafts 10, 12 prior to the time that the nuts 20, 22 engage web portions 28, 34.

Referring to FIG. 4, a modified form of the invention is shown. The coupling member is designated by the numeral 54 and is of unitary construction. Coupling member 54 includes an O-shaped web 56 having end hubs 58, 60 on opposite ends thereof. Hubs 58, 60 include tapered surfaces 62 which are initially smooth, but which are adapted to receive the tapered threaded bores 64 of nuts 66, 68. Hubs 58, 60 are also provided with cylindrical central bores 70 for receiving the ends of shafts 10, 12. The nuts 66, 68 are constructed of a substantially harder and stronger material than the elastomeric material of which coupling member 54 is constructed so that the threads on the internal bore 64 of nuts 66, 68 impose complementary threads on the outer tapered surfaces 62 of hubs 58, 60. Continued threading of nuts 66, 68 onto hubs 58, 60 causes the hubs to compress radially inwardly and tightly grip the shafts 10, 12.

Referring to FIGS. 7-9, a modified form of the coupling member is shown and is designated by the numeral 71. Coupler 71 includes end hubs 72, 74 which are similar in construction to the hubs 58, 60 shown in FIGS. 4-6. They include a cylindrical bore 76 for receiving shafts 10, 12, and an outer tapered surface 78 for receiving the tapered threaded bore 80 of a pair of nuts 82, 84. Coupler 71 includes a central web 86 which includes an annular seam 88. Annular seam 88 lies in a plane which is perpendicular to the rotational axis of shafts 10, 12. Seam 88 is formed by heat sealing two separate identical halves together to form the unitary coupler 71. Thus, during the construction of coupler 71, the coupler is intially fabricated by forming two substantially identical halves which are adapted to be joined along the seam 88 which lies in a plane perpendicular to the plane of rotation of shaft 10. Heat is applied at the seam 88 until the two surfaces reach the softening or melting point of the plastic, then the two surfaces are forced together to form the complete coupling and allowed to cool. This provides a unitary coupling 71 in its completed form.

The couplings shown in FIGS. 1 through 9 include hubs which have substantially smooth outer surfaces. However, it is possible to form hubs with preformed threads on their outer tapered surfaces. FIG. 10 illustrates the hub 90 having a tapered outer surface with threads 92 preformed thereon.

It is also possible to form hub 90 with a plurality of grooves 94 on the internal cylindrical bore for receiving a splined shaft 96.

FIG. 11 shows a modified form of the present invention wherein a hub 98 includes a cylindrical bore 100 having a flat surface 102 adapted to conform to a flat surface 104 on shaft 106. Thus, it can be seen that flats, splines, keys, or other locking devices may be provided between the end hubs and the drive shaft or driven shaft, or friction alone obtained by tightening the nuts on the end hubs may be relied upon for driving the coupling.

Thus, it can be seen that the device accomplishes at least all of its stated objectives.

What is claimed is:

1. A flexible coupling for joining a first rotatable drive shaft and a second rotatable driven shaft together, each of said shafts having a distal end, a longitudinal axis, and an outer surface, said coupling comprising:

a coupling body comprising a first end hub having an integrally formed tapered outer surface, a second end hub having an integrally formed tapered outer surface, and a central web therebetween, said first and second end hubs each comprising an inner bore, said inner bores of said first and second end hubs being sized to frictionally receive said distal ends of said first and second shafts, respectively;

at least portions of said first end hub, said second end hub, and said central web being integrally formed with one another;

first and second nuts, each having a threaded bore extending therethrough, said threaded bore being tapered along its length so as to conform to said tapered outer surface of said first and second end hubs, respectively;

said first and second nuts surrounding and being directly threaded upon said outer tapered surfaces of said first and second end hubs, respectively, to a lock position wherein said first and second nuts exert an inward radial force on said first and second end hubs, respectively;

said first and second end hubs and said central web all being comprised of an elastomeric plastic material which permits said first and second end hubs to be compressed radially inwardly to reduce the size of said bores therein in response to said inward radial force caused by said nuts being threaded to said lock position, whereby threading of said first and second nuts to said lock position when said first and second shafts are frictionally received within said bores of said first and second end hubs respectively causes said first and second end hubs to grip and tightly hold said first and second shafts against movement relative to said coupling body.

2. A coupling according to claim 1 wherein said elastomeric material of said central web of said coupling body being capable of flexing in response to misalignment of said first and second flexible shafts, and being capable of transmitting rotational movement from said first drive shaft to said second driven shaft.

3. A coupling according to claim 2 wherein said central web includes an outer flexible peripheral wall and a centrally located cavity.

4. A coupling according to claim 3 wherein said peripheral wall only partially encloses said centrally located cavity and said centrally located cavity is partially open to the atmosphere.

5. A coupling according to claim 3 wherein said peripheral wall completely encloses said centrally located cavity.

6. A coupling according to claim 1 wherein said first and second shafts include splines on the outer surfaces thereof, said bores of said first and second hubs having complementary splines thereon for matingly receiving said splines on said first and second shafts respectively.

7. A coupling according to claim 1 wherein said first and second shafts each include a flat surface on said distal end thereof, said bores of said first and second end hubs each having a complementary flat surface thereon for matingly receiving said first and second shafts respectively.

8. A coupling according to claim 1 wherein said coupling body comprises first and second separate body parts fitted together to form said coupling body, said first and second nuts each surrounding portions of said first and second body parts and holding said first and second body parts together when said first and second nuts are threaded to said lock position.

9. A coupling according to claim 8 wherein said first and second body parts each comprise a first hub portion, a web portion, and a second hub portion integrally formed with one another, said first hub portions of said first and second body parts being fitted together to form said first end hub, said web portions of said first and second body parts being fitted together to form said central web, and said second hub portions of said first and second body parts being fitted together to form said second end hub.

10. A coupling according to claim 9 wherein said first body part includes at least one alignment nipple and said second body part includes at least one nipple receptacle for matingly receiving said alignment nipple when said first and second body parts are fitted together.

11. A coupling according to claim 1 wherein said outer tapered surfaces of said first and second end hubs are smooth, said elastomeric material of said first and second end hubs being capable of deforming into complementary threads in response to threading of said first and second nuts being threaded onto said outer tapered surfaces of said first and second hubs.

12. A coupling according to claim 1 wherein said outer tapered surfaces of said first and second end hubs have complementary threads thereon for threadably receiving said first and second end nuts respectively.

13. A method for joining a rotatable driving shaft having a longitudinal axis to a rotatable driven shaft having a longitudinal axis, said method comprising:

inserting said driving shaft into a bore of the first hub of a coupling member, said coupling member being of unitary construction formed from an elastomeric material and also comprising a second hub and a central web positioned between said first and second hubs, said first and second hubs each having integrally formed outer tapered surfaces;

inserting said driven member into a bore within said second hub;

threading first and second locking nuts directly onto said tapered surfaces of said first and second hubs, respectively, until said first and second locking nuts reach a locking position exerting an inward radial force on said first and second hubs, said first and second hubs being comprised of a compressible material which will compress radially inwardly into gripping engagement with said driving member and said driven member respectively, in response to said inward radial force;

rotating said drive shaft and simultaneously permitting said longitudinal axes of said drive shaft and said driven shaft to become misaligned whereby said web portions of said first and second coupling bodies flex and bend in response to said misalignment of said drive shaft and said driven shaft while at the same time transmitting rotation from said drive shaft to said driven shaft.

14. A method for joining a rotatable drive shaft having a longitudinal axis and a distal end to a rotatable driven shaft having a longitudinal axis and a distal end, said method comprising:

positioning said drive shaft and said driven shaft in end to end spaced apart relation with one another whereby said distal end of said drive shaft is spaced apart from and facing said distal end of said driven shaft;

taking a flexible coupling assembly comprising first and second coupling bodies each of which is integrally formed from an elastomeric material and each of which comprises a first hub portion having an inner surface conforming to at least part of the circumference of said drive shaft and having an integrally formed outer surface, a second hub portion having an inner surface conforming to at least part of the circumference of said driven shaft and having an integrally formed outer surface, and a web portion extending between said first and second hub portions, said outer surfaces of said first and second hub portions each having a tapered shape which progresses radially outwardly along its axial length;

placing said first and second coupling bodies on opposite sides of said drive shaft and said driven shaft with said first hub portions of said first and second coupling bodies embracing opposite sides of said drive shaft and with said second hub portions of said first and second coupling bodies embracing opposite sides of said driven shaft, said web portions of said first and second coupling bodies spanning the space between said distal ends of said drive shaft and said driven shaft;

placing a first nut having a threaded bore extending therethrough around said outer surfaces of said first hub portions of said first and second coupling bodies;

threading said first nut directly onto said first hub portions of said first and second coupling bodies to a drive shaft lock position wherein said threaded bore of said first nut exerts an inner radial force on said first hub portions so as to cause said first hub portions of said first and second coupling bodies to grip said drive shaft tightly therebetween and hold said drive shaft against movement relative to said first hub portions;

placing a second nut having a threaded bore extending therethrough around said outer surfaces of said second hub portions of said first and second coupling bodies;

threading said second nut directly onto said second hub portions of said first and second coupling bodies to a driven shaft lock position wherein said threaded bore of said second nut exerts an inner radial force on said second hub portions of said first and second coupling bodies so as to cause said second hub portions of said first and second coupling bodies to grip said driven shaft therebetween and hold said driven shaft against movement relative to said second hub portions;

rotating said drive shaft and simultaneously permitting said longitudinal axes of said drive shaft and said driven shaft to become misaligned whereby said web portions of said first and second coupling bodies flex and bend in response to said misalignment of said drive shaft and said driven shaft while at the same time transmitting rotation from said drive shaft to said driven shaft.

15. A flexible coupling according to claim 1 wherein all of said first end hub, all of said second end hub and all of said central web of said coupling body are formed into a singular unitary member formed of a homogeneous elastomeric plastic material.

16. A flexible coupling according to claim 9 wherein said first and second body parts are identical in construction.

* * * * *